United States Patent [19]

Tahan

[11] Patent Number: 5,135,965
[45] Date of Patent: Aug. 4, 1992

[54] HYDROGEL-FORMING POLYMERS USED IN INTRAOCULAR LENSES

[75] Inventor: Menashe Tahan, London, United Kingdom

[73] Assignee: T. R. Developments, Ltd., London, United Kingdom

[21] Appl. No.: 220,995

[22] Filed: Sep. 15, 1988

Related U.S. Application Data

[63] Continuation of Ser. No. 809,933, Dec. 16, 1985, abandoned.

[51] Int. Cl.$^5$ .................. C08L 89/00; C08G 63/48; G02C 7/04
[52] U.S. Cl. .................. 523/106; 523/108; 525/54.2; 525/54.21; 525/54.22; 525/54.23; 525/54.3; 525/54.31; 525/54.32; 526/238.2; 526/238.21; 526/238.22; 526/238.23; 351/160 H
[58] Field of Search .................. 525/54.2, 54.21, 54.22, 525/54.23, 54.3, 54.31, 54.32; 526/238.2, 238.21, 238.22, 238.23; 523/106, 108; 351/160 H

[56] References Cited

U.S. PATENT DOCUMENTS

| | | | |
|---|---|---|---|
| 3,220,960 | 11/1965 | Wichterle | 521/149 |
| 3,699,089 | 10/1972 | Wichterle | 526/328.5 |
| 3,822,089 | 7/1974 | Wichterle | 351/160 R |
| 4,139,578 | 2/1979 | Baughman et al. | 525/39 |
| 4,276,402 | 6/1981 | Chromecek et al. | 526/264 |
| 4,433,111 | 2/1984 | Tighe et al. | 523/108 |
| 4,504,641 | 3/1985 | Nochumson | 526/238.2 |
| 4,511,646 | 4/1985 | Fohrenkamm et al. | 430/283 |
| 4,620,954 | 11/1986 | Singer et al. | 264/1.4 |

FOREIGN PATENT DOCUMENTS

| | | |
|---|---|---|
| 2118197 | 10/1983 | United Kingdom . |
| 2157300 | 10/1985 | United Kingdom . |
| 2157301 | 10/1985 | United Kingdom . |

*Primary Examiner*—Nathan M. Nutter
*Attorney, Agent, or Firm*—Ross, Howison, Clapp & Korn

[57] ABSTRACT

Hydrogel-forming polymers for contact lenses and intraocular lenses having increased toughness despite high equilibrium water content comprise a hydrophilic monomer (e.g. an N-vinyl lactam) and a polyunsaturated polymeric cross-linking agent. UV-absorbers are also disclosed which are bound in the polymer structure so as to be inextractable, some undergoing photo-Fries re-arrangement on exposure to UV-radiation so as to become UV-absorbers in the re-arranged form.

9 Claims, No Drawings

HYDROGEL-FORMING POLYMERS USED IN INTRAOCULAR LENSES

This application is a continuation of application Ser. No. 809,933 filed Dec. 16, 1985 and now abandoned.

The invention relates to cross-linked polymers which can be hydrated to form hydrogels having improved mechanical properties despite a generally high equilibrium water content. The polymers of the invention are particularly, but not exclusively, useful in the field of optical prostheses (i.e. contact lenses and intraocular implants) as well as in reverse osmosis membranes and in controlled-release devices for controlled discharge of an active ingredient, particularly in a physiological environment.

Soft contact lenses are made of hydrogel, a hydrated cross-linked polymer containing hydrophilic monomer units. In use, these lenses cover the cornea, a body of avascular tissue which requires a continuous supply of oxygen from the air in order for it to function. If starved of adequate oxygen supply, the cornea swells and becomes hazy, producing dangerous impairment of vision. Oxygen supply to the cornea in a normal eye takes place by diffusion through the tear fluid and thus the supply when the cornea is covered by a contact lens must take place by diffusion through the lens and by tear circulation to the area beneath the lens. In practice, the latter route is inadequate alone so that contact lenses must be oxygen-permeable if they are to be worn for any length of time.

The oxygen permeability of a hydrogel is a property of its material and depends primarily on the equilibrium water content, high water contents producing a lens of high oxygen permeability and low water contents lower oxygen permeability. For this reason, high equilibrium water content hydrogels are used for extended wear lenses whilst hydrogels of low water content are limited to use for daily wear lenses.

Extended wear lenses are normally also made in considerably smaller thicknesses than daily wear lenses. This is largely because thickness determines the actual oxygen transmissibility of the finished lens. However, another major reason for use of small thicknesses is the additional wearer comfort resulting from the low volume of the lens in the eye as well as the reduced level of tear production which such lenses require for their surface to be covered with a continuous permanent tear film which enables the lens to function as an efficient optical device and to remain reasonably clean.

Both methods, either of increasing the water content, or of reducing the lens thickness, suffer nevertheless from a serious drawback. In both cases the lens loses physical strength and its firmness. It becomes too soft for positive eyelid interaction and thus loses the ability to keep clean. It becomes too soft to centre properly in the eye and thus it loses stability of vision. The ultra thin lenses also become fragile and tend to break easily. The lens also tends to adhere to the eyeball and thus prevents adequate tear circulation. It also tends to buckle and becomes difficult to handle. the soft contact lens and especially the thin and the ultra thin lens tends therefore to lose most of the advantages they were initially designed to gain.

The main reason for that is the inadequate moduli of the hydrogels used for these devices. The modern hydrogels possess low modulii to enable them to function properly in the eye. Formation of hydrogels with higher modulii could overcome most of the existing drawbacks of modern soft contact lenses, which drawbacks have been mentioned earlier. However, raising the hydrogels modulii would result in rendering them brittle and the lenses made out of them even more fragile. Improving the hydrogels modulii ought therefore go hand in hand with maintaining their other physical properties and even further improving them. While the higher modulus is required to form efficient thin or ultra thin lenses that can supply enough oxygen to the cornea for extended wear use, improvement of the toughness is also required to extend the life of the lens and to make it suitable for daily wear use too.

Only the hydrogels which possess the combination of higher modulii with physical strength would qualify to form the desirable thin or ultra thin lens for both daily and extended wear.

Improved hydrogel-forming polymers need to further possess good machining and moulding characteristics, improved hydrogel surface properties and improved UV absorption characteristics which are imperative in cases of aphakia.

Attempts to improve the toughness of hydrogels have been proposed in the past but these have been unsatisfactory for various reasons. U.S. Pat. No. 4,327,202 (Foley), for example, addresses the lack of toughness in polyhydroxyalkylated (meth) acrylic esters such as polyhydroxyethylmethacrylate (HEMA). In Foley, styrene or a styrene derivative is included in the polymer to provide toughness, thus producing a hydrophilic-hydrophobic system typified by HEMA-styrene. HEMA has an equilibruim water content of only 38.5% at 20° C. and this is, of course, lowered by the styrene to a level which is not adequate to provide the oxygen transmissibility needed for extended wear. Methacrylic acid is included to raise the water content to a reasonable level but this use of an acidic material gives rise to dimensional and optical instability depending on local pH conditions. Foley's lenses were also not ultra-thin, Foley reporting only thicknesses down to 0.5 mm.

Similar approaches to Foley are described in U.S. Pat. Nos. 3,080,348 and 3,983,083, although in the latter case the polymers concerned were soft at room temperature and needed to be machined at low temperature.

Intraocular lenses (IOL's) are bioimplants implanted surgically into the eye in patients whose natural crystalline lens has been surgically removed in a cataract operation.

It is of prime importance to reduce the size of the incision made in the eye during this operation. For this reason it is specially important that the IOL should possess high equilibruium water content. The higher the water content of the lens the more it would shrink on drying.

The high water content IOL could be partially dried before the cateract operation. Thus it would shrink considerably enabling a small size incision for inserting the lens into the eye. Once in position the semi-dried IOL would gain its water content from the liquids of the eye and swell back to its original parameters.

Intraocular lenses are also required to possess good mechanical properties such as high tensile strength and modulus since they are implanted as permanent prostheses which cannot easily be replaced should they suffer mechanical damage. They also need to possess improved surface properties so as to avoid deposit on the lens which could cause impairment of vision.

As in the case of the natural crystalline lens, the IOL needs to absorb UV light in the solar region (290–400 nm) so as to filter this damaging light out of the human sight.

It has now been found that hydrogel forming polymers of improved modulii can be produced in a way that eliminates deterioration of the physical strength of the hydrogels. Furthermore, the method according to the invention may result in hydrogels of both improved modulii and physical strength at the same time. It may also improve the machinability and the moulding properties of the polymers, the surface properties of the hydrogels and their UV absorption characteristics.

According to the invention, a cross-linked hydrogel-forming polymer comprises one or more hydrophilic monomers and is given improved tensile modulus without deterioration of strength and toughness by inclusion of one or more polyunsaturated polymeric cross-linking agents.

In preferred embodiments of the invention, the hydrophilic monomer is a nitrogen-containing monomer, preferably a heterocyclic monomer.

Heterocyclic N-vinyl monomers are especially preferred, for example N-vinyl lactams.

Preferred N-vinyl lactams are pyrrolidone, piperidone and caprolactam derivatives, such as N-vinyl-2-piperidone, N-vinyl-2-pyrrolidone, N-vinyl caprolactam or derivatives thereof.

As an alternative to N-vinyl lactams, the heterocyclic N-vinyl monomer may be N-vinyl imidazole, N-vinyl succinamide or N-vinyl glutarimide.

Alternative nitrogen-containing monomers to the heterocyclic monomers referred to above are amido derivatives of (meth) acrylic compounds, for example a (meth) acrylamide or an N-substituted derivative thereof. Preferred are those which are mono- or di-substituted with, for example alkyl, hydroxyalkyl or aminoalkyl substituents. Specific examples of such materials are N-methyl acrylamide, N-isopropyl acrylamide, N-diacetone acrylamide, N,N-dimethyl acrylamide, N,N-dimethylaminomethyl acrylamide, N,N-dimethylaminoethyl acrylamide, N-methylaminoisopropyl acrylamide or a methacrylamide analog of any one of the foregoing.

The hydrophilic monomer may alternatively be any other vinyl or allyl monomer.

Examples are a monovinyl ether, a monovinyl polyether, a hydroxylated vinyl ether, an aminoalkyl (meth) acrylate, a hydroxyalkyl (meth) acrylate or an alkoxy derivative thereof.

The hydroxyalkyl (meth) acrylate may be, for example, mono-, di- or tri- hydroxylated, with the alkyl moiety in any event preferably being of one to four carbon atoms (especially ethyl and propyl). Specific hydroxyalkyl (meth) acrylates are 2-hydroxyethyl methacrylate, hydroxypropyl acrylate, hydroxypropyl methacrylate, 2, 3-dihydroxypropyl methacrylate and their alkoxy derivatives.

The aminoalkyl (meth) acrylate may conveniently be one in which the amino group thereof is either unsubstituted or is mono- or di- alkyl substituted, for example aminoethyl (meth) acrylate, dimethylaminoethyl methacrylate, methylaminoethyl methacrylate and diethylaminoethyl methacrylate. Other (meth)acrylic acid derivatives are also envisaged.

The hydrophilic monomers are conveniently present in an amount of at least 35% by weight based on the weight of the polymer, a proportion of 50% by weight or more on the same basis being preferred. Proportions are varied depending primarily on the desired equilibrium water content of the hydrogel, proportions within the ranges specified above normally providing acceptably high water contents for hydrogels suitable for use in extended wear contact lenses.

Whilst the polymers of the invention may contain low molecular weight cross-linking agents (i.e. monomers containing at least two olefinic bonds per molecule), it is crucial to the invention that one or more polyunsaturated polymeric cross-linking agents (i.e. polymers having multiple unsaturation along the polymeric backbone) are included in the hydrogel-forming polymers. The chains constituted by these polymeric cross-linking agents serve to provide reinforcement, somewhat analogously to the fibre-reinforcement provided by incorporating, for example, glass or carbon fibres in polymer compositions for other applications. They thus produce an improvement in both toughness and stiffness which facilitates production of thin and ultra-thin lenses as well as lens durability. The resilience of the hydrogel-forming polymers was also improved to enable lenses made therefrom to have high recovery speed when resiliently deformed in use (for example in the eye).

The polyunsaturated polymeric cross-linking agent (preferably present in an amount of 0.5% by weight or more) may conveniently be a polyunsaturated polyester resin of average molecular weight 1,500 to 10,000, such as 2,000 to 8,000 (e.g. about 3,500). The polyunsaturated polyester resin may be aliphatic or or aromatic type and in particular may be a terephthalate- or isophthalate-based polyunsaturated polyester resin such as phenylterephthalate- or phenylisophthalate-containing polyunsaturated polyester resin.

Terephthalate-based resins are preferred in terms of the properties of the resulting hydrogels but isophthalate-based resins are preferred on cost grounds. Polyunsaturated polyester resins may be used as such or as a mixture in which a polyunsaturated polyester resin is dissolved in one or more monomers required in polymerization to produce the hydrogel-forming polymer.

As an alternative to polyunsaturated polyester resins, the polymeric cross-linking agent may be any unsaturated derivative of a natural or synthetic homopolymer or copolymer containing multiple functional groups along its chain, the derivative typically having an average molecular weight of 25,000 to 100,000, (e.g. about 50,000). Such functional groups include, for example, hydroxy, amino, carboxy, sulphonic and chloromethylene groups as well as their activated derivatives. The natural or synthetic polymers referred to may thus be, for example, polyvinyl alcohol, cellulose or a cellulose ester such as cellulose acetate, cellulose butyrate or a mixed ester such as cellulose acetate butyrate, PVA-vinyl acetate copolymer or polymethylmethacrylate-2-hydroxyethylmethacrylate copolymer. Multiple pendant unsaturation produced in the above homo/copolymers may be allyl or vinyl (e.g. acrylic or methacrylic), examples of polyunsaturated polymeric cross-linking agents accordingly being cellulose.acetate acrylate, cellulose acetate methacrylate, other (meth)acrylic esters of cellulose or a cellulose ester, and polyvinyl alcohol (meth) acrylic esters.

Further alternative polyunsaturated polymeric cross-linking agents are (meth) acrylic amido derivatives of polyamines ("(meth) acrylic" used throughout means acrylic or methacrylic).

The polymeric cross-linking agent need not be a homopolymer but could be a copolymer of two or more monomers, the only requirement being that it has the requisite multiple unsaturation and, in practice, that it be soluble in the reaction mixtures used to produce the hydrogel-forming polymers of the invention. Typical unsaturation degree in the case of cellulose ethers may be one to three unsaturations per recurring glucose unit (two glucose groupings having a molecular weight of 534 in the case of a typical cellulose acetate methacrylate) down to one per 8 or 12 glucose units (e.g. one unsaturation per 3 to 5 glucose units). In the case of polyesters, the unsaturation is actually one per recurring unit and may be as low as one per each of two to three recurring units. Expressed as a ratio unsaturations:molecular weight typical degree of unsaturation ranges from 1:2000 or 3000 upwards (e.g. 1:2000 to 1:500 or 1:200 such as 1:1000 or 1: about 300 or 350).

Any of the polymeric cross-linking agents mentioned herein especially the polyesters may be fluorinated (or substituted with other substituents) and it has been found that, when used in fluorinated form, it becomes more efficient and improved on the machinability of the polymer and the surface properties of the hydrogel after hydration.

Non-polymeric cross-linking agents which may be used in the invention in addition to polyunsaturated polymeric cross-linking agents include any monomer containing two or more olefinic unsaturations per molecule. Specific examples are ethylene glycol dimethacrylate, diethyleneglycol dimethacrylate, tri, tetra or polyethyleneglycol dimethacrylate, and also divinylbenzene, divinylethylene urea, divinypropylene urea, allyl methacrylate, trimethylol propane trimethacrylate, diallyl phthalate, fumarate or maleate, diethylene glycol bis(allyl carbonate) and ethoxylated bisphenol A dimethacrylate, or dipentaerythritol monohydroxy pentacrylate or pentamethacrylate.

The non-polymeric cross-linking agent may, of course, contain three or more olefinic unsaturations per molecule, specific examples being trimethylolpropane trimethacrylate, diallyl fumarate, diallyl maleate and dipentaerythritol monohydroxy penta(meth)acrylate.

In addition to the presence of hydrophilic monomers, the polymers according to the invention may contain one or more hydrophobic monomers, usually to enable the equilibrium water content of the hydrogel to be adjusted to a predetermined level (and sometimes also to affect other properties). (Meth) acrylic alkyl esters (e.g. C1-4 alkyl esters) are typical hydrophobic monomers for use in the invention, specific examples being methyl acrylate, methyl methacrylate, ethyl acrylate and ethyl methacrylate. Other vinyl or allyl hydrophobic monomers may be used, for example vinyl acetate, vinyl propionate, styrene, styrene derivatives and alkyl maleates.

The polymers of the invention may conveniently contain a fluorinated aromatic carbocyclic monomer. These monomers have been found to enable reduction in the amount of polymeric cross-linking agent required for a hydrogel-forming polymer with particular desired strength and toughness qualities. Similarly, they improve on the machinability of the polymer and the surface properties of the hydrogels. A particularly useful class of such carbocyclic monomers are those of the general formula:

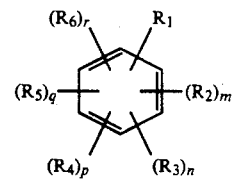

wherein $R_1$ is an optionally fluorinated unsaturated moiety, $R_2$ is fluorine, $R_3$ to $R_6$ each represent identical or different substituents, n to r are, each independently, zero or one, m is zero or an integer up to a value $5-(n+p+q+r)$ with the proviso that m is zero only when $R_1$ is a fluorinated unsaturated moiety. The monomer may, for example, be di-, tri-, tetra or pentafluorinated on the aromatic ring.

$R_1$ may be an ethylenically unsaturated optionally halogenated hydrocarbon moiety of, for example, 2 to 6 carbon atoms, for example, optionally halogenated vinyl, allyl or homologue thereof.

$R_3$ to $R_6$ may be identical or different substituents other than fluorine (e.g. other halogen substituents or hydrocarbon substituents such as alkyl groups of, for example, 1 to 4 carbon atom).

In an embodiment of the invention, the carbocyclic monomer is one in which $R_1$ is a fluorinated ethylenically unsaturated hydrocarbon moiety and m to r are zero.

The fluorinated carbocyclic monomer may in particular be a fluorinated styrene (including at least parafluoro substitution), penta fluoro styrene being preferred.

As mentioned above, the fluorinated carbocyclic monomer enables a desirable level of strength and toughness to be achieved with decreased contents of polymeric cross-linking agent, although this is generally to some extent at expense of tensile modulus or recovery speed. It will thus be appreciated that the capacity to vary the amount and type of both the polymeric cross-linking agent and the fluornated monomer represents a tool by means of which the polymer can be produced with tailored mechanical properties. In addition to mechanical properties, optical properties can similarly be varied and, moreover, the fluorinated monomer has been found to improve the surface properties of lenses made from polymers according to the invention. This obviously has an influence on the tendency of the lens to suffer surface soiling, thus providing another factor determining the use of the fluorinated monomers. The fluorinated monomer also improves casting of the polymer to a lens configuration (an aspect of surface property improvement) and hard polymer machinability.

The fluorinated carbocyclic monomer is conveniently used in an amount of not more than 25% by weight of all the materials used to form the polymer, a preferred proportion being 15% or less. The most preferred range of proportion is 0.5% to 10% (e.g. 3% to 10%).

UV light has long been recognized to be hazardous to human sight. This is especially so after a cataract operation when the natural crystalline lens with its capacity to filter UV light in the solar region (wavelengths 290–400 nm) has been removed.

It is thus generally desirable for intraoclular lenses to absorb UV light in the same region and this is equally desirable in the case of the polymer materials of the present invention.

To prevent leaching out, it is preferred that the polymer should contain UV-absorbing components polymerized/chemically bound therein. For example, the polymer may include at least one monomer containing a UV-absorbing moiety which in the final polymer network will be located as a side group attached to the polymer backbone so as to be bound inextractable UV-absorber. The UV-absorbing monomer, which may be used in small amounts, eg 0.1 to 10% (preferably 0.1 to 2%) by weight of the materials used to form the polymer, may be a monoethylenically unsaturated monomer, for example 4-benzoyl-3-hydroxy phenyl(meth)acrylate. Alternatively, the UV-absorbing moiety may be part of a cross-linking monomer. Cross-linking agents which are oligomeric may also be used in incorporate UV-absorbing components into the polymer structure. Residues of chromophores such as the following may be employed to provide the UV-absorbing moieties, namely hydroxybenzophenones and benzotriazoles such as 2-hydroxybenzophenone; 2,4-dihydroxybenzophenone; 2,2',4-trihydroxybenzophenone; 2,2',4,4'-tetrahydroxy benzophenone; 2-(2H-benzotriazol-2-yl) phenol; or derivatives thereof.

Alternatively, the chromophone may be UV-absorbing substituted cinnamic acid or a derivative thereof.

The chromophore may also be a derivative of phenyl or other aryl esters capable of photo-Fries re-arrangement to form 2-hydroxybenzophenone derivatives bound in the polymer, for example resorcinol monobenzoate, phenyl salicylate, diaryl terephthalate, diaryl isophthalate or their derivatives.

It has been found that certain of the polymeric cross-linking agents referred to earlier possess UV-absorption characteristics in the solar region. Thus, for example, terephthalate- and isophthalate-based polyunsaturated polyester resins possess UV-absorption maxima in the solar range. Phenyltherephthalate-containing and phenylisophthalate-containing polyunsaturated polyester resins undergo Fries re-arrangement on exposure to UV-radiation to form 2-hydroxybenzophenone which functions as a UV-absorption moiety bound in the structure of the hydrogel-forming polymer. The Fries re-arrangement is illustrated below:

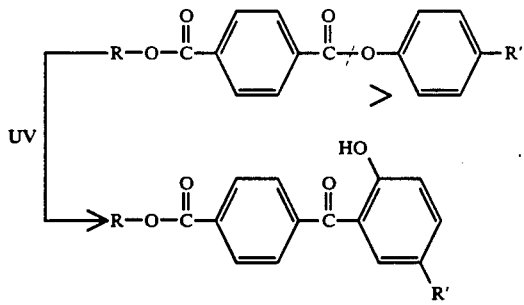

It will be appreciated that UV-absorbing moieties bound in the polymer structure as mentioned above are of advantage since the UV-absorbing components are not leached from the polymer in the optical environment and therefore there is no loss of UV-absorbing properties and no risk of toxic effects due to materials leaching into the eye.

The polymers of the invention may be prepared by radiation polymerization or by heating a polymerization mixture in the presence of one or more chemical initiators.

In the case or radiation polymerization, the radiation will preferably be ionizing gamma-radiation, for example from a cobalt 60 source. Other forms of radiation, such as electron beams and photon beams, may however, be used as an alternative.

Examples of chemical initiators are those which generate free radials, such as hydroperoxides or organic peroxides such as the benzoyl peroxide, a percarbonate such as di-isopropyl percarbonate or di-cyclohexyl percarbonate, a redox system or an azo compound such as azobisisobutyronitrile.

Heating at temperatures in the range of 30°-95° C. is generally suitable to polymerise the mixture. It is desirable to conduct the heating in a cycle, i.e. in a series of stages at increasing temperatures, the early stages (30°-60° C.) being conveniently carried out in a water bath or oven, while the later stages may be preferably carried out in an oven. The last stage is a post-cure treatment and may be conducted at 85°-95° C. possibly under vacuum.

Apart from monomers, cross-linking agents and any required initiators, the monomer mixture may contain one or more solvents to help dissolve the polymers or monomers, or to affect one or more of the physical and mechanical properties of the final product.

The polymerisation is preferably effected in a mould. The mould will conveniently take the final shape of a desired article or may be as close as possible to it, so that subsequent machining is either not necessary or is minimized. The mould may also provide a simple shape e.g. a rod or sheet which could be used to provide blanks. The blanks may then be machined to produce a desired article such as a contact lens or an intraocular lens.

The hydrogel-forming polymers of the present invention are suitable for use in contact with living tissue and are thus suitable for making (by moulding and/or machining) into bioimplantable devices such as intraocular lenses and contact lenses of various thickness (e.g. thick, thin or ultra thin) as they combine flexibility with improved tensile modulus and adequate toughness. They are particularly suitable for making into intraocular lenses as they can be made to possess any required equilibrium water content and to absorb UV light in the solar region. Dyes may be incorporated in the monomer mix before polymerisation or may be used to colour the soft article at a later stage. Pharmaceutically effective substances may be incorporated into the microporous structure of the polymers and then be released into the human body on a controlled slow-release basis. For example, the polymers according to this invention may be formed into a bandage lens for an eye and drugs such as antibiotic substances may be incorporated into the lens for gradual diffusion into the eye. The polymers may be used to form other slow release materials for administering active ingredients such as drugs to a physiological environment and may also be used, for example, as fallopian tube closures. They may also be swollen with oil or organic solvent to form organogels.

As will be appreciated from the Examples which follow, one class of preferred polymers according to the invention comprises (i) methyl methacrylate, (ii) ethoxylated bisphenol A dimethacrylate, (iii) polyethylene glycol dimethacrylate, (iv) allyl methacrylate, (v) 2-hydroxyethyl methacrylate, (vi) cellulose acetate methacrylate, (vii) diacetone acrylamide and (viii) N-vinyl pyrrolidone in the preferred by weight amounts 30 parts (i), 0.3 parts (ii), 0.25 parts (iii), 0.25 parts (iv), 2.5 parts (v), 1.5 parts (vi), 0.25 parts (vii) and 65 parts (viii).

In a second aspect, the invention provides crosslinked hydrogel-formed polymers comprising a fluorinated aromatic carbocyclic monomer and such a proportion of such a strongly hydrophilic comonomer that a body of a hydrogel formed by hydration thereof has an equilibrium water content at 20° C. of preferably more than 50%, especially more than 60%, as well as IOL's and contact lenses made of such polymers. A preferred such contact lens for extended wear, the lens has a thickness and water content such that its oxygen transmissibility on the Fatt scale is at least $200 \times 10^{-10}$(cm/sec)(ml O$_2$/ml $\times$ mm Hg) at 35° C.

The invention further provides a UV-absorbing hydrogel-forming polymer comprising at least one hydrophilic monomer and optionally at least one nonhydrophilic monomer characterized in that the polymer includes units containing a UV-absorbing moiety which in the final polymer network is bound as part of the polymer structure. The polymer may include a polyunsaturated polymeric cross-linking agent.

The hydrophilic monomer may be an acrylate of the general formula:

wherein R is H or alkyl (eg C1–C4 alkyl such as methyl) and R$^1$ is hydroxy— or alkoxy—alkyl, for example hydroxyethyl(meth)acrylate, dihydroxypropylmethacrylate, ethoxyethylmethacrylate; an N-vinyl lactam, N-vinyl imidazole, N-vinyl succinamide, N-vinyl glutarimide, a vinyl or allyl ether, (meth)acrylamide, aminoacrylate, and derivatives thereof.

The units containing the UV-absorbing moiety may be monomer units or molecules of an oligomeric or polymeric crosslinking agent. The monomer units may be units of a comonomer or a monomeric cross-linking agent. The monomer units may contain any of the chromophores specified earlier, in particular a chromophore which undergoes photo-Fries re-arrangement on exposure to UV-radiation to form a re-arrangement product which absorbs UV-radiation, such as an aryl ester which undergoes UV-Fries rearrangement to form 2-hydroxybenzophenone derivatives bound in the polymer.

The following specific Examples are intended to illustrate the invention.

In the Examples, $\overline{MW}$ means the approximate weight average molecular weight. Degree of unsaturation is expressed as number of unsaturations per segment of molecular weight 1000 and is necessarily approximate.

EXAMPLE 1

A mixture of 10 g freshly distilled pentafluorostyrene, 17.6 g freshly distilled methyl methacrylate, 0.2 g diallyl phthalate, 0.2 g diallyl maleate and 7 g of purified cellulose acetate acrylate of Example 16 ($\overline{MW}$=50,000; degree of unsaturation = 1/1000) was thoroughly shaken then dissolved in 165 g of N-vinyl-2-pyrrolidone. Then 0.4 g azobisisobutyronitrile was added and the solution was thoroughly mixed, filtered and degassed under vacuum. Part of it was then sealed in a low density polythene tube. The tube was subjected to a heating cycle of 40 hrs at 40° C., 6 hrs at 60° C. and 16 hrs at 90° C. and then left to cool slowly to room temperature.

Discs of 1 mm thickness were machined from the hard plymer produced by the above method and then immersed in normal saline at 20° C. for hydration until reaching equilibrium (3–7 days). The equilibrium water content was 70.5% and the hydrated discs were clear, tough and flexible with high tensile modulus.

The rest of the polymerisation mixture was cast into films between glass plates, sealed with silicon rubber gaskets and then subjected to the same heating cycle as above. The glass plates were then opened and the hard film was hydrated as before. Similarly, the equilibrium water content was 70.5% and the mechanical properties of the hydrated film were measured using ASTM D6 38-77a and and D1004-66 for tensile properties and initial tear resistance, respectively. The tensile modulus at 40% strain was 19.5 kg/cm$^2$, the tensile strength 19 kg/cm$^2$ and the initial tear resistance was 400 g/mm.

Discs of the material could be machined into contact lenses thinner than 0.1 mm in their hydrated state, allowing an oxygen transmissibility on the Fatt scale of more than $360 \times 10^{-10}$ (cm/sec)(ml O$_2$/ml $\times$ mm Hg) at 35° C.

EXAMPLE 2

A mixture of 10 g freshly distilled pentafluorostyrene, 13.6 g freshly distilled methyl methacrylate, 0.2 g diallyl phthalate, 0.2 g diallyl maleate, 2 g of Scott-Bada Crystic 191LV, a commercial, clear isophthalate based polyunsaturated polyester resin (which contains 36% styrene; $\overline{MW}$=3,500; degree of unsaturation=1/363) and 7 g of purified cellulose acetate acrylate referred to in Example 1, was thoroughly shaken and then dissolved in 167 g of N-vinyl-2-pyrrolidone. Then 0.4 g azobisisobutyronitrile was added and the solution was thoroughly mixed, filtered and degassed under vacuum. Part of it was then sealed in a low density tube. The tube was subjected to a heating cycle of 40 hrs at 40° C., 6 hrs at 60° C. and 16 hrs at 90° C. and then left to cool slowly at room temperature. Discs of 1 mm thickness were machined from the hard polymer obtained by the above procedure and then immersed in normal saline at 20° C. for hydration until reaching equilibrium (3–7 days). The equilibrium water content was 70.2% and the hydrated discs were clear, stiffer than those of Example 1; however they were still tough and flexible. The hydrated discs showed UV absorption bands between 190 to 300 nm.

The rest of the polymerisation mixture was cast into films between glass plates, sealed with silicon rubber gaskets and then subjected to the same heating cycle as above. The glass plates were then opened and the hard film was hydrated as before, giving rise to the same equilibrium water content. The mechanical properties of the hydrated films were measured as in Example 1. The tensile modulus at 40% strain was 22 kg/cm$^2$, the tensile strength was 15 kg/cm$^2$ and the initial tear resistance was 320 g/mm.

Discs of the material could be machined into contact lenses thinner than 0.1 mm in their hydrated state, allowing an oxygen transmissibility on the Fatt scale of more than $360 \times 10^{-10}$ (cm/sec)(ml O$_2$/ml $\times$ mm Hg) at 35° C.

EXAMPLE 3

A mixture of 1.6 g freshly distilled pentafluorostyrene, 3.3 g freshly distilled methyl methacrylate, 0.02 g diallyl phthalate, 0.02 g diallyl maleate, 0.06 g ethyoxylated bisphenol A dimethacrylate, 0.8 g of the isophthalate-based polyunsaturated polyester resin referred to in Example 2 and 0.8 g of purified cellulose acetate methacrylate of Example 15 ($\overline{MW}$=50,000; degree of unsaturation=1/1000) was thoroughly shaken and then dissolved in 33.4 g of N-vinyl-2-pyrrolidone. Then 0.08 g azobisisobutyronitrile was added and the solution was thoroughly mixed, filtered and degassed under vacuum, and then sealed in a low density polythene tube. The tube was subjected to a heating cycle of 40 hrs at 43° C., 6 hrs at 60° C. and 16 hrs at 90° C. and then left to cool slowly to room temperature. Discs of 1 mm thickness were machined from the hard polymer obtained by the above procedure and then immersed in normal saline at 21° C. for hydration until reaching equilibrium (3–7 days). The equilibrium water content was 74.2% and the hydrated discs were clear, stiff yet tough and flexible. In addition, the hydrated discs showed strong UV absorption bands between 190 to 300 nm.

Discs of the material could be machined into contact lenses thinner than 0.06 mm in their hydrated state, allowing an oxygen transmissibility on the Fatt scale of more than $420 \times 10^{-10}$ (cm/sec)(ml $O_2$/ml $\times$ mm Hg) at 35° C.

EXAMPLE 4

A mixture of 1 g freshly distilled pentafluorostyrene, 3.5 g freshly distilled methyl methacrylate, 0.1 g diallyl phthalate, 0.75 g of a the, isophthalate-based polyunsaturated polyester resin referred to in Example 2, 1.5 g of purified cellulose acetate methacrylate of Example 3 and 0.05 g of 4-benzoyl-3-hydroxyphenyl methacrylate was thoroughly shaken and then dissolved in 43.1 g of N-vinyl-2-pyrrolidone. 0.1 g of azobisisobutyronitrile was then added and the solution was thoroughly mixed, filtered and degassed under vacuum, and then sealed in a low density polythene tube. The tube was subjected to a heating cycle of 40 hrs at 40° C., 6 hrs at 60° C. and 16 hrs at 90° C. and then left to cool slowly to room temperature. Discs of 1 mm thickness were machined from the hard polymer thus produced and then immersed in normal saline at 20° C. for hydration until reaching equilibrium (3–7 days). The equilibrium water content was 78% and the hydrated discs were still tough and stiff enough for their high water content. The hydrated discs, after extraction with ethanol (3 times over night) and boiling in distilled water for 8 hrs, still absorbed UV light in the solar region indicating the presence of a bound UV absorber in the hydrogel.

Discs of the material could be machined into contact lenses thinner than 0.2 mm in their hydrated state, allowing an oxygen transmissibility on the Fatt scale of more than $250 \times 10^{-10}$ (cm/sec)(ml $O_2$/ml $\times$ mm Hg) at 35° C.

EXAMPLE 5

A mixture of 6 g freshly distilled methylmethacrylate, 0.1 g diallyl phthalate, 0.75 g of the polyunsaturated polyester resin of Example 2 and 1.5 g of the purified cellulose acetate methacrylate of Example 3 was throughly shaken and then dissolved in 41.65 g of N-vinyl-2-pyrrolidone. 0.1 g of azobisisobutyronitrile was then added and the solution was thoroughly mixed, filtered and degassed under vacuum and sealed in a low density polythene tube. The tube was subjected to a heating cycle of 40 hrs at 40° C., 6 hrs at 60° C. and 16 hrs at 90° C. and then left to cool slowly to room temperature. Discs of 1 mm thickness were machined from the hard polymer thus produced and then immersed in normal saline at 20° C. for hydration until reaching equilibrium (3–7 days). The equilibrium water content was 78% and the hydrated discs were tough and stiff enough for such a high water content. They also showed UV absorption bands between 190 to 300 nm.

Discs of the material could be machined into contact lenses thinner than 0.2 mm in their hydrated state, allowing an oxygen transmissibility on Fatt scale of more than $250 \times 10^{-10}$ (cm/sec)(ml $O_2$/ml $\times$ mm Hg) at 35° C.

EXAMPLE 6

A solution of 1.12 g solid isophthalate based polyunsaturated polyester resin referred to in Example 2 but dissolved in 14 g freshly distilled methyl methacrylate, 0.15 g ethoxylated bisphenol A dimethacrylate, 0.1 g diallyl maleate and 1.25 g 2-hydroxyethylmethacrylate was added to a mixture of solids which contained 0.75 g cellulose acetate methacrylate of Example 3 and 0.12 g diacetone acrylamide, thoroughly shaken and then dissolved in 32.51 g of N-vinyl-2-pyrrolidone. 0.1 g of azobisisobutyronitrile was then added and the solution was thoroughly mixed, filtered and degassed under vacuum, and then sealed in a low density polythene tube. The tube was subjected to a heating cycle of 40 hrs at 40° C., 6 hrs at 60° C. and 16 hrs at 90° C. and left to cool slowly to room temperature. Discs of 1 mm thickness were machined from the hard polymer thus produced and then immersed in normal saline at 20° C. for hydration until reaching equilibrium (3–7 days). The equilibrium water content was 60% and the hydrated discs were clear, stiff, tough yet still flexible. They also showed strong UV absorption bands between 190 and 300 nm and this property remained after attempting absorber extraction in boiling water and organic solvents.

Discs of the material could be machined into contact lenses thinner than 0.1 mm in their hydrated state, allowing an oxygen transmissiblity on the Fatt scale of more than $250 \times 10^{-10}$ (cm/sec)(ml $O_2$/ml $\times$ mm Hg) at 35° C.

EXAMPLE 7

A solution of 1.12 g of the solid isophthalate-based polyunsaturated polyester resin of Example 6 in 13.96 g freshly distilled methyl methacrylate, 0.15 g ethoxylated bisphenol A dimethacrylate, 0.1 g diallyl maleate and 1.25 g 2-hydroxyethyl methacrylate, was added to a mixture of solids which contained 0.75 g cellulose acetate methacrylate of Example 3, 0.12 g diacetone acrylamide and 0.05 g 4-benzoyl-3-hydroxyphenyl methacrylate, thoroughly shaken and then dissolved in 32.5 g of N-vinyl-2-pyrrolidone. 0.1 g of azobisisobutyronitrile was then added and the solution was thoroughly mixed, filtered and degassed under vacuum, and then sealed in a low density polythene tube. The tube was subjected to a heating cycle of 40 hrs at 40° C., 6 hrs at 60° C. and 16 hrs at 90° C. and then left to cool slowly to room temperature. Discs of 1 mm thickness were machined from the hard polymer thus produced and then immersed in normal saline at 20° C. for hydration until reaching equilibrium (3–7 days). The equilibrium water content was 59% and the hydrated discs were clear, stiff, tough yet flexible and capable of absorbing UV in the solar region, after extractions with with ethanol, ether and boiling water.

Discs could be machined into contact lenses with similar dimensions and properties to those of Example 6.

EXAMPLE 8

0.75 g of the purified cellulose acetate methacrylate of Example 3 and 0.5 g of crystallised diacetone acrylamide was added to a mixture of 12.6 g of freshly distilled methyl methacrylate, 0.15 g ethoxylated bisphenol A dimethacrylate, 0.13 g polyethylene glycol dimethacrylate, 0.12 g allyl methacrylate and 5 g 2-hydroxyethyl methacrylate, and was throughly shaken. It was then dissolved in 30.75 g of N-vinyl-2-pyrrolidone, filtered and degassed under vacuum, and then sealed in a low density polythene tube. The tube was subjected to a dose of 2.5 MegaRads of ionising radiation from a Cobalt 60 source. Discs of 1 mm thickness were machined from the hard polymer thus produced and then immersed in normal saline at 20° C. for hydration until reaching equilibrium (3–7days). The equilibrium water content was 63% and the hydrated discs were flexible, stiff yet tough and clear.

EXAMPLE 9

A solution of 0.48 g isophthalate based polyunsaturated polyester resin of Example 2 in 0.27 g styrene was added to a mixture of 20 g purified 2-hydroxyethyl methacrylate, 8.95 g freshly distilled methyl methacrylate, 0.1 g ethoxylated bisphenol A dimethacrylate, 0.1 g diallyl phthalate, 0.1 g diallyl maleate, 1 g purified diacetone acrylamide and 19 g N-vinyl-2-pyrrolidone. The mixture was shaken and 0.1 g of azobisisobutyronitrile was added. The solution was then thoroughly mixed, filtered and degassed under vacuum and sealed in a low density polythene tube. The tube was subjected to a heating cycle the same as that of Example 7 above, then left to cool slowly to room temperature. Discs of 1 mm thickness were machined from the hard polymer thus obtained and hydrated in normal saline at 20° C. until equilibrium (3–7days). The equilibrium water content was 42.7% and the hydrated discs were resilient, stiff and yet tough. The discs also showed UV absorption bands between 190 to 300 nm.

EXAMPLE 10

2.5 g of freshly distilled pentafluorostyrene was added to a mixture of 47.25 g 2-hydroxyethyl methacrylate and 0.25 g of allyl methacrylate and thoroughly shaken together. 0.1 g of azobisisobutyronitrile was added and the solution was mixed, degassed and sealed in a low density polythene tube as in Example 8. The tube was subjected to the same heating cycle and discs from the hard polymer obtained were hydrated to equilibrium as in the previous example. The equilibrium water content was 28.9% and the hydrated discs were stiff and white in colour.

EXAMPLE 11

A solution of 12.6 g of freshly distilled methyl methacrylate, 0.15 g ethoxylated bisphenol A dimethacrylate, 0.13 g polyethylene glycol dimethacrylate, 0.12 g allyl methacrylate and 5.0 g 2-hydroxyethyl methacrylate was added to a mixture of 0.75 g of the purified cellulose acetate methacrylate of Example 3 and 0.5 g diacetone acrylamide. The whole mixture was shaken and then dissolved in 30.75 g of N-vinyl-2-pyrrolidone. 0.1 g of azobisisobutyronitrile was added and the solution was thoroughly mixed, filtered and degassed under vacuum and sealed in a low density polythene tube. The tube was subjected to a heating cycle of 40 hrs at 40° C., 6 hrs at 60° C. and 16 hrs at 90° C. and then left to cool slowly to room temperature. Discs of 1 mm thickness were machined from the hard polymer thus produced and then immersed in normal saline at 20° C. for hydration until reaching equilibrium (3–7 days). The equilibrium water content was 60.0% and the hydrated discs were flexible yet stiff, tough and clear.

EXAMPLE 12

A solution of 15.375 g freshly distilled methyl methacrylate, 0.15 g ethoxylated bisphenol A dimethacrylate, 0.125 g polyethylene glycol dimethacrylate, 0.125 g allyl methacrylate and 1.25 g 2-hydroxyethyl methacrylate was added to a mixture of 0.75 g of the purified cellulose acetate methacrylate of Example 3 and 0.125 g diacetone acrylamide. The whole mixture was shaken and then dissolved in 32.1 g of N-vinyl-2-pyrrolidone. 0.1 g of azobisisobutyronitrile was added and the solution was thoroughly mixed, filtered and degassed under vacuum and sealed in a low density polyethylene tube. The tube was subjected to a heating cycle of 40 hrs at 40° C., 6 hrs at 60° C. and 16 hrs at 90° C. and then left to cool slowly to room temperature. Discs of 1 mm thickness were machined from the hard polymer thus produced and then immersed in normal saline at 20° C. for hydration until reaching equilibrium (3–7 days). The equilibrium water content was 60.5% and the hydrated discs were stiff, tough and clear. It was found to be suitable for the production of soft intraocular lenses.

EXAMPLE 13

Plano lenses of hydrated parameters of 9.0 mm in radius, 14.5 mm in diameter and 0.2 mm in thickness were manufactured from the polymer of Example 11. They were thoroughly cleaned, sterilized and then soaked in preservative-free 1% pilocorpine hydrochloride drops for 2 hrs. Then the lenses were used to treat the eyes of patients who suffer from acute closed-angled glaucoma. The presoaked lenses released in the eye over 90% of the pilocorpine in 4.0 hrs and reduction of the intraocular pressure was obtained.

EXAMPLE 14

Crystallized 4-benzoyl-3-hydroxyphenyl methacrylate was dissolved in 2-hydroxyethylmethacrylate, cross-linking agent (allylmethacrylate) and other monomers in different formulations as specified in the Table. 0.2 g of azobisisobutyronitrile was then added to each formulation and the different solutions were thoroughly mixed, filtered and degassed under vacuum. Each formulation was then sealed in low density polythene tubes. The tubes were subjected to a heating cycle of 40 hrs at 50° C., 6 hrs at 60° C. and 16 hrs at 90° C. and then left to cool slowly to room temperature. Discs of about 0.1 mm in thickness were machined from the hard polymers thus produced and then hydrated in saline as in Example 1. The equilibrium water contents of the different formulations were ranged between 34 to 43% as indicated in the Table. The hydrated discs were clear and they absorbed UV light between 190 to 400 nm before and after extraction with ethanol, ether and boiling water.

EXAMPLE 15

1.25 liters petroleum ether 40–60 is placed in a 3 liter round flask in a fume cupboard. 100 g of freshly distilled methacryloyl chloride is added and the mixture is thoroughly stirred. 500 g of cellulose acetate (Eastman Kodak No. 4650) is now added slowly, while stirring mers such as 4-benzoyl-3-hydroxyphenyl (meth)acrylate, or the corresponding triazole derivative, polymerized therein.

TABLE

| Compounds | Formulation I (grams) | Formulation II (grams) | Formulation III (grams) | Formulation IV (grams) | Formulation V (grams) |
|---|---|---|---|---|---|
| 2-Hydroxyethyl methacrylate | 99.06 | 88.06 | 88.06 | 88.06 | 88.06 |
| 4-Benzoyl-3-hydroxyphenyl methacrylate | 0.63 | 0.56 | 0.56 | 0.56 | 0.56 |
| Allyl methacrylate | 0.31 | 0.28 | 0.28 | 0.28 | 0.28 |
| N-vinyl-2-pyrrolidone | — | 11.10 | — | — | — |
| N,N-dimethylaminoethyl methacrylate | — | — | 11.10 | — | 5.55 |
| Diacetone acrylamide | — | — | — | 11.10 | 5.55 |
| Equilibrium Water Content, % | 38.10 | 43.10 | 41.80 | 34.90 | 39.00 | constantly. Then the flask is sealed, covered and left to stand at room temperature overnight. The mixture is then refluxed for 8 hours at 45° C., sealed and cooled in the fridge overnight. The solid is subsequently transferred into a thimble placed beforehand in a fume cupboard and extracted with ether in a soxhlet for three days, 8 hrs a day. 200 g of granulated NaOH is placed in the flask of the soxhlet to decompose the acid chloride and to convert the organic acid formed into its solid sodium salt:

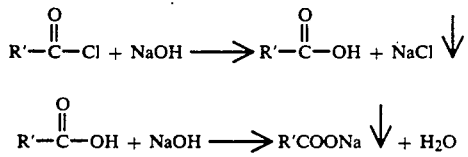

$$R'-\overset{O}{\underset{\|}{C}}-Cl + NaOH \longrightarrow R'-\overset{O}{\underset{\|}{C}}-OH + NaCl \downarrow$$

$$R'-\overset{O}{\underset{\|}{C}}-OH + NaOH \longrightarrow R'COONa \downarrow + H_2O$$

The solids are removed every day together with the ether and replaced by new portions of NaOH (200 g) and diethyl ether. In the fourth day the cellulose acetate methacrylate is placed between layers of filter paper in the fume cupboard for 5-6 hours in order to evaporate the ether. The resulting dry powder is then sieved in a 50 mesh sieve, placed in a dark bottle and kept in the freezer.

EXAMPLE 16

100 g of freshly distilled acryloyl chloride and 500 g of cellulose acetate are added one by one through constant stirring to 1.25 liters of petroleum ether 40-60 as in Example 15. The flask is then sealed and placed in the fridge for one week. The solid is subsequently transferred into a thimble and extracted with ether in a soxhlet for three days as in Example 15. In the fourth day the cellulose acetate acrylate thus formed is dried between sheets of filter paper, sieved and bottled as before (Example 15).

The invention includes within its scope all hydrogel-forming polymers, for use in optical prosthesis, containing UV-absorbing components bound therein, for example HEMA-based and other polymers containing mono-

I claim:

1. An intraocular lens made from a cross-linked hydrogel-forming polymer comprising at least one hydrophillic monomer and at least one polyunsaturated polymeric cross-linking agent.

2. The intraocular lens of claim 1 wherein the hydrogel-forming polymer is cross-linked by said polymeric cross-linking agent in combination with a non-polymeric cross-linking agent.

3. A contact lens made from a cross-linked hydrogel-forming polymer comprising at least one hydrophillic monomer and at least one polyunsaturated polymeric cross-linking agent.

4. The intraocular lens of claim 3 wherein the hydrogel-forming polymer is cross-linked by said polymeric cross-linking agent in combination with a non-polymeric cross-linking agent.

5. An intraocular lens made of a UV-absorbing hydrogel-forming polymer comprising at least one hydrophillic monomer and at least one polyunsaturated polymeric cross-linking agent, the polymer including units containing a UV-absorbing moiety which in the final polymer network is bound as part of the polymer structure.

6. The intraocular lens of claim 5 wherein the hydrogel-forming polymer further comprises at least one non-hydrophillic monomer.

7. A contact lens made of a UV-absorbing hydrogel-forming polymer comprising at least one hydrophillic monomer and at least one polyunsaturated polymeric cross-linking agent, the polymer including units containing a UV-absorbing moiety which in the final polymer network is bound as part of the polymer structure.

8. The contact lens of claim 7 wherein the hydrogel-forming polymer further comprises at least one non-hydrophillic monomer.

9. A moulded lens blank for use as an ocular lens following machining, the blank comprising a body of a hydrogel-forming polymer as defined in any one of claims 1 to 8.

* * * * *